United States Patent [19]

Agnew et al.

[11] 4,034,975
[45] July 12, 1977

[54] READING MACHINE FOR PUNCHED DOCUMENT CARDS

[75] Inventors: Mark Charles Agnew; John Ralph Reidenbach; James Michael Rigotti, all of Rochester, Minn.

[73] Assignee: International Business Machines Corporation, Armonk, N.Y.

[21] Appl. No.: 473,595

[22] Filed: May 24, 1974

[51] Int. Cl.² .................. B65H 3/06; B65H 5/06
[52] U.S. Cl. ........................... 271/10; 271/118; 271/127; 271/166; 271/225
[58] Field of Search ............ 271/118, 117, 10, 110, 271/127, 207, 225, 4, 226, 134, 166; 235/61.11 C

[56] References Cited

U.S. PATENT DOCUMENTS

| 596,098 | 12/1897 | Whitehead | 271/118 X |
|---|---|---|---|
| 1,377,810 | 5/1921 | De Escobales | 271/135 |
| 2,114,927 | 4/1938 | Krell | 271/207 X |
| 2,184,218 | 12/1939 | Heinrich | 271/226 |
| 2,517,984 | 8/1950 | Cunningham | 235/61.11 C |
| 2,567,223 | 9/1951 | Maher et al. | 271/135 X |
| 3,160,411 | 12/1964 | Fiehl | 271/117 X |
| 3,218,063 | 11/1965 | Boyce | 271/135 |
| 3,514,098 | 5/1970 | Ostwald | 271/110 |
| 3,561,756 | 2/1971 | Barnett | 271/135 X |
| 3,666,262 | 5/1972 | Fowler et al. | 271/251 |
| 3,790,162 | 2/1974 | Halbert | 271/118 |
| 3,847,382 | 11/1974 | McKee | 271/118 X |
| 3,917,258 | 11/1975 | Miller | 271/225 X |

Primary Examiner—Bruce H. Stoner, Jr.
Attorney, Agent, or Firm—Keith T. Bleuer

[57] ABSTRACT

A processing machine, particularly a reader, for punched document cards including a hopper for a deck of the document cards, pick rolls disposed beneath the hopper in such position as to feed the document cards transversely thereof from the bottom of the hopper, a vertically movable hopper bed for moving the deck onto and off of the pick rolls to make them effective or ineffective, a deck lifter positioned beneath the card deck in the hopper for supporting one side of the card deck after the bottommost card has been moved transversely thereof partially out from underneath the other cards in the deck, driving rolls for moving the bottommost card longitudinally after it has been partially so moved from underneath the rest of the deck and means operative for reading punched holes in the document card on continued longitudinal movement of the card.

11 Claims, 16 Drawing Figures

READING MACHINE FOR PUNCHED DOCUMENT CARDS

BACKGROUND OF THE INVENTION

The invention relates to punched document cards and more particularly to a reading machine for such cards.

The conventional IBM 80 column document card is rectangular in shape and has 80 columns and 12 rows for punching. The columns and rows respectively extend transversely and longitudinally of the card. The punched openings are ordinarily rectangular in shape and are one-eighth inch long extending transversely of the card. The rows are generally spaced ¼ inch, center to center.

It has been recognized that a machine for operating on such cards shall preferably be of the serial type, that is, one in which the cards pass through the machine longitudinally of the card. A punched hole responsive starwheel for reading the punched holes in such a card need thus only be provided for each of the 12 rows of punched openings in the card rather than one for each of the 80 columns.

It has been proposed previously that such a machine include mechanism for serially moving each of the cards from the bottom of a deck of the cards; however, due to the alignment of the webs of adjacent punched openings in each of the rows, the webs of the lowermost card being fed interlock and tear with respect to the webs of the card immediately above the lowermost card in the deck.

SUMMARY OF THE INVENTION

It is an object of the present invention to provide an improved machine of this type in which the cards move serially through the machine and which is of such construction that such web interlocking and tearing is prevented. In this connection, it is an object of the invention to provide means for moving each of the cards from the bottom of a deck transversely of the card and then moving the card serially, after it has been partially moved out from the deck, through the machine for a reading operation, for example.

It is also an object of the invention to provide improved card picking mechanism and means for partially supporting the deck as the bottommost card is being moved out from underneath the rest of the deck. In this connection, it is an object to provide a vertically movable hopper bed, moving down to expose a plurality of pick rolls for moving the bottommost card partially out from underneath the rest of the deck, and to provide a deck lifter movable with the hopper bed for partially supporting the card deck with respect to the lowermost card moved out from underneath the deck to relieve the bottommost card from a substantial load incurred from the remaining deck.

It is also an object of the invention to provide means for maintaining the bottom card of the deck in a flat condition as it is being moved from underneath the deck so that a sensor effective on the trailing edge of the card accurately indicates the location of column 1 of the card as it feeds through the remainder of the machine.

DESCRIPTION OF THE PREFERRED EMBODIMENT

Referring now to the drawings, the illustrated punched document card reading machine may be seen to comprise in general a document card hopper 30, a vertically movable hopper bed 32, a card deck lifter 34, a friction pick roll assembly 36, a throat knife 38, a pair of continuously rotating feed rolls 40 and 42, a pressure roll assembly 44 cooperating with the rolls 40 and 42, a read station 46 into which the rolls 40 and 42 propel a document card and a stacker 48 at the output end of the read station 46.

The machine is built on a base frame 50 having standards 52 and 54 as spaced sides. A transport bed 56 is fixed with respect to and extends between the standards 52 and 54. The upper surface of the bed 56 is generally flat except for an upwardly raised portion 56a at one end having a flat central surface 56b and downwardly extending surfaces 56c and 56d at the ends of the central surface 56b (see FIGS. 7 and 7a).

Figure 10:
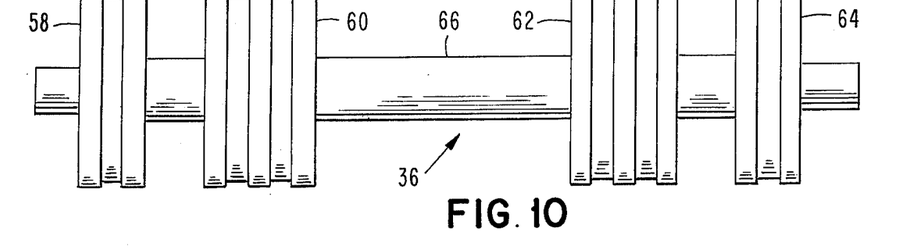
FIG. 10 is a side elevational view of the pick roll assembly of the machine.

The pick roll assembly 36 comprises four grooved pick rolls 58, 60, 62 and 64 fixed on a shaft 66 (see FIG. 10). The rolls 58, 60, 62 and 64 are of relatively soft elastomeric material and have longitudinal holes 68 extending through them for the purpose of rendering them even more yieldable. The shaft 66 is rotatably mounted in the bed 56 in such a manner that the rolls 58, 60, 62 and 64 extend upwardly out of the bed 56.

Figure 4:
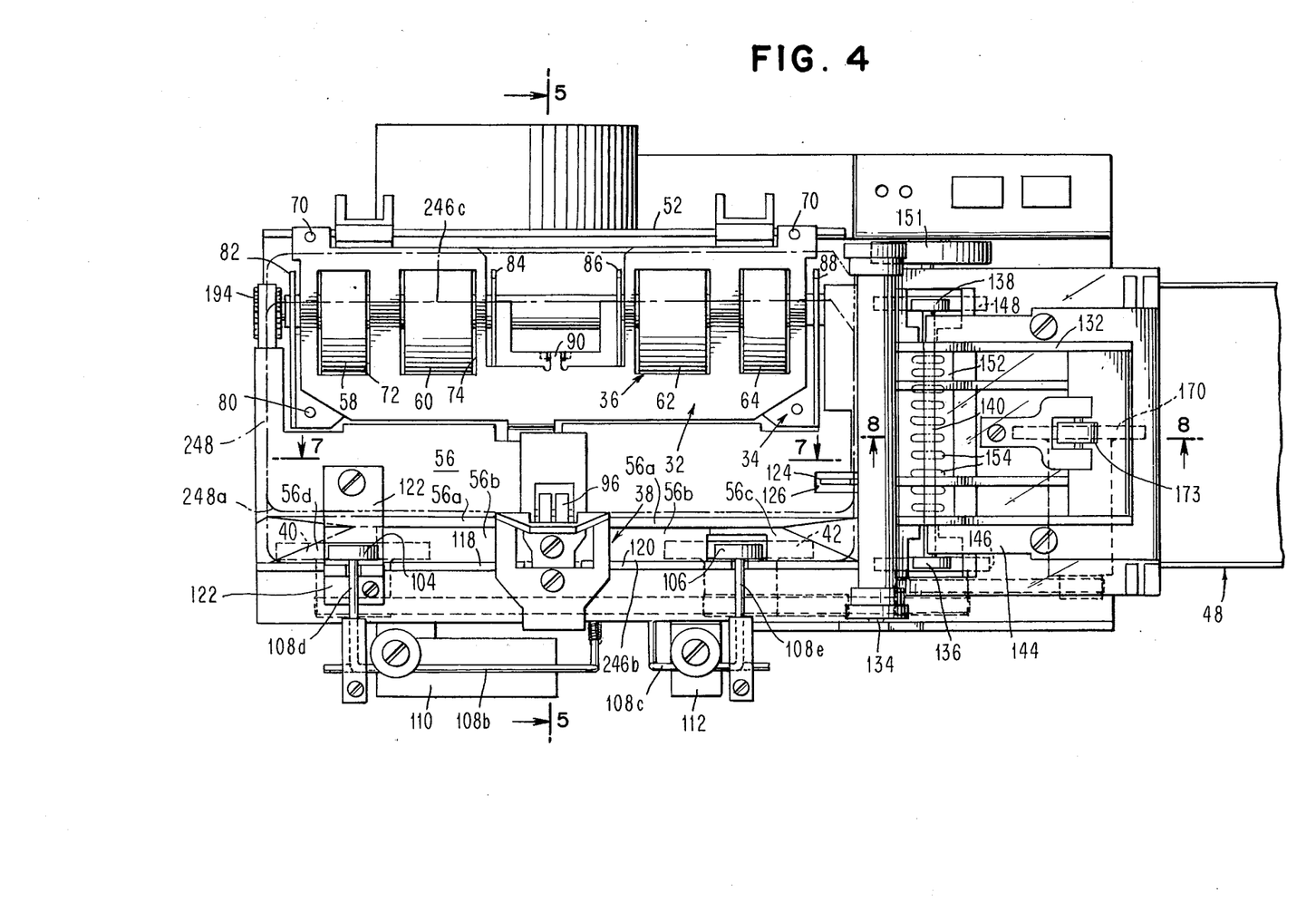
Figure 5:
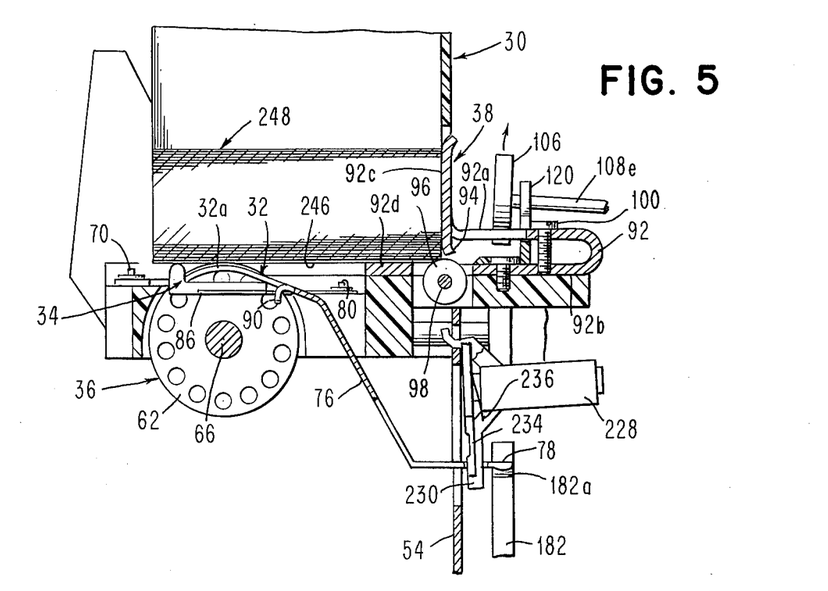
FIG. 5 is a sectional view taken on line 5—5 of FIG. 4 and including a sectional view of a document card pick roll assembly.

The hopper bed 32 constitutes a plate which is pivotally mounted on studs 70 at the sides of the transport bed 56 (see FIG. 5). The hopper bed 32 has curved portions 32a that lie alongside of the upper peripheries of the rolls 58, 60, 62 and 64 and has openings 72 and 74 (see FIG. 4) therethrough through which the rolls 58, 60, 62 and 64 extend. The openings 72 are relatively narrow for accommodating the relatively narrow rolls 58 and 64, and the openings 74 are relatively wide for accommodating the relatively wide rolls 60 and 62. The hopper bed 32 has a central portion 76 that extends downwardly through the transport bed 56 and has an end portion 78 extending through the standard 54.

The deck lifter 34 is pivotally mounted on studs 80 fixed with respect to the transport bed 56 and is made with four fingers 82, 84, 86 and 88. The fingers 82 and 88 are disposed at the two side edges of the hopper bed 32, and the fingers 84 and 86 are disposed adjacent the central rolls 60 and 62 in an cutout provided in the hopper bed 32. The deck lifter 34 pivots along with the pivotal movement of the hopper bed 32 by virtue of a tang 90 formed on the hopper bed 32 and extending downwardly through and underneath a portion of the deck lifter 34 (see FIG. 5).

The throat knife 38 comprises a sheet metal piece 92 that is U-shaped in cross section to have nearly parallel legs 92a and 92b (see FIG. 5). The piece 92 is bent at a right angle to leg 92a to have an upstanding card abutment portion 92c and is bent slightly downwardly on leg 92b to have an inclined ramp portion 92d. A knife 94 is formed out of the portions 92a and 92c and extends downwardly. A roller bearing 96 extends through leg 92b and has its supporting axle 98 welded to the undersurface of leg 92b. It will be observed that the lower end of the knife 94 is in close proximity to the surface of the roller bearing 96. The piece 92 is fixed by any suitable means with respect to the bed 56, and a screw 100 extends through legs 92a and 92b so that the spacing of the knife 94 with respect to the outer surface of the bearing 96 may be adjusted. It is contemplated that the spacing between the lower end of the knife 94 and the bearing 96 shall be just slightly greater than the thickness of a document card used in the machine.

The rolls 40 and 42 are respectively fixed on support shafts 101 and 102 and are rotatably mounted with respect to the transport bed 56 by means of the shafts. The rolls 40 and 42 extend upwardly through openings in the bed 56, and the assembly 44 includes two pressure rolls 104 and 106 respectively adapted to have pressure nips with the rolls 40 and 42. The assembly 44 includes a cam follower member 108 formed from shafting and bent to have a downwardly U-shaped cam follower portion 108a, coaxially extending portions 108b and 108c and roller mounting portions 108d and 108e respectively extending at right angles to the portions 108b and 108c (see FIGS. 3 and 4). The member 108 is swingably disposed with respect to the transport bed 56 by means of journals 110 and 112, and the lower end of the U-shaped portion 108a of the member 108 is adapted to be acted on by a cam assembly 114 to be hereinafter described in greater detail for swinging the member 108. The rollers 104 and 106 are respectively rotatably disposed on the portions 108d and 108e so that the rollers may have a pressure nip respectively with the rolls 40 and 42 and may be raised out of contact with the latter rolls as the member 108 is swung under the action of the cam assembly 114. A spring 116 extends between standard 54 and the U-shaped portion 108a of the member 108 yieldably holding the portion 108a in contact with the cam assembly 114.

Figure 3:
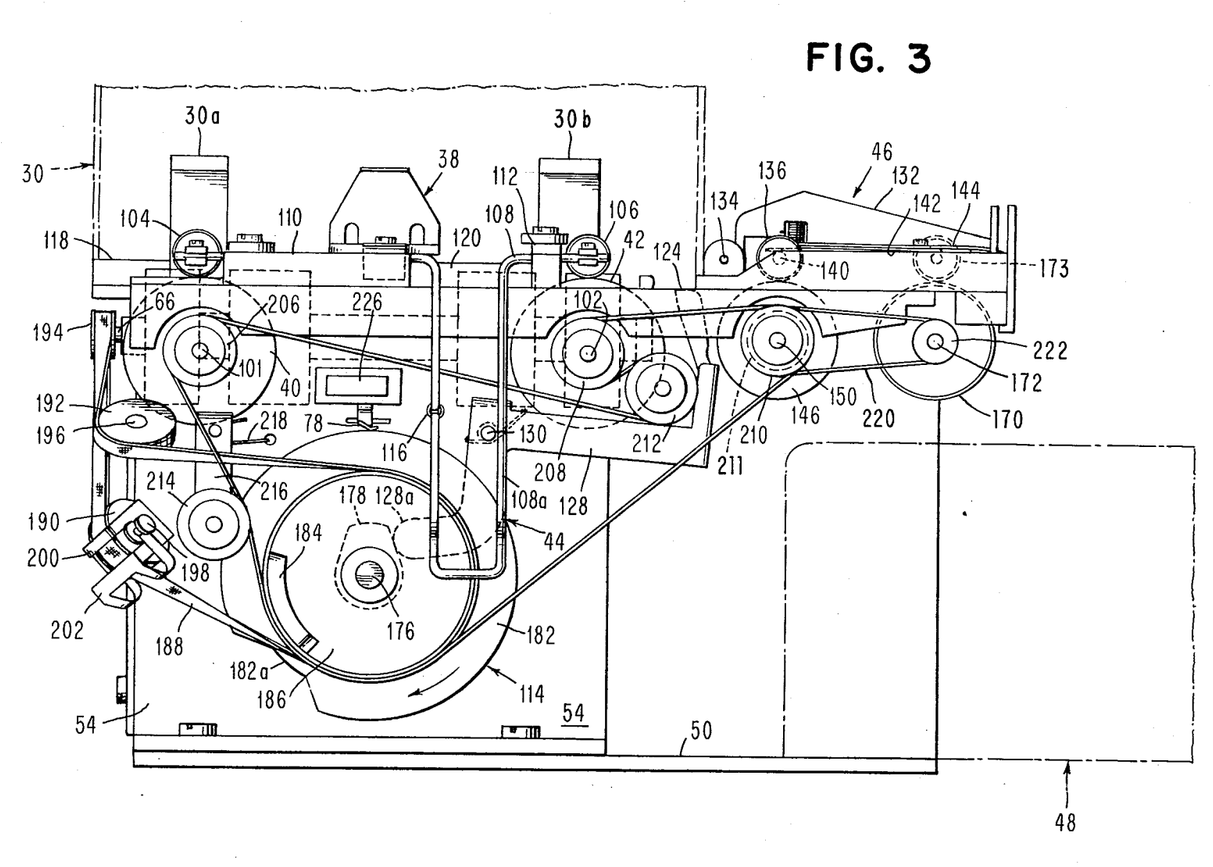

A pair of card alignment rails 118 and 120 are fixed with respect to the bed 56 and extend above the surface of the bed 56 just behind the rolls 104 and 106. A document card sensor 122 is located on the bed 56 adjacent the rolls 40 and 104. The sensor 122 may be of a conventional type including a phototransistor and a light source coaxially disposed with respect to the phototransistor between which a document card moves as it approaches the rails 118 and 120. A card straightening finger 124 extends through an opening 126 provided in the bed 56 at an end thereof remote from the sensor 122 (see FIG. 4). The finger 124 constitutes an end of a lever 128 that is swingably mounted on the frame portion 54 by means of a pin 130. The lever 128 is actuated by the cam mechanism 114 as will be subsequently described. Any suitable return spring may be provided for the lever 128, such as one extending around the pin 130 for yieldably holding the lever 128 in its position as illustrated in FIG. 3.

The read station 46 includes a cover 132 that is swingably mounted with respect to the bed 56 by means of a hinge 134. The cover 132 may be held down in its position illustrated in FIG. 3 by any suitable fastening means. The cover 132 includes a pair of pressure rolls 136 and 138 that are rotatably disposed on a shaft 140. The shaft 140 is welded to a leaf spring 142, and a downward bias (as seen in FIG. 3) is exerted on the spring 142 and the shaft 140 by means of an upper leaf spring 144 that bears on the spring 142 and is fixed with respect to the cover 132. The rolls 136 and 138 respectively have pressure nips with drive rolls 146 and 148 that are fixed on a shaft 150. The shaft 150 is rotatably disposed with respect to the transport bed 56 and is driven as will be subsequently described. An opto/electronic timing emitter 151 is coupled to the end of the shaft 150 for providing electrical pulses as the shaft 150 rotates.

A plate 152 (see FIG. 4) having a plurality of slots 154 therein is fixed to the lower surface of the cover 132. A document hole sensing starwheel 156 (see FIGS. 8 and 9) extends into each of the slots 154 and is rotatably disposed on the end of a lever 158 that is fixed at its base end to the under surface of the switch plate 159. The lever 158 has a narrowed section 158a adjacent its point of connection with the lower surface of the switch plate 159 so as to allow the lever 158 to swing with respect to its point of attachment. A relatively thin, short spring 160 is formed to act in conjunction with the lever 158. A plunger 162a is carried by the spring 160 and is disposed in an opening 162 formed in the lever 158. The plunger 162a is adapted to contact a pressure diaphragm switch 164. The switch 164 is of conventional construction and hence will not be described in detail except to state that it includes a flexible diaphragm 166 which, when moved into contact with an electric conducting layer 168, completes an electric circuit. A leaf spring 169 provides upward force on the lever 158.

A rubber tired card discharge roll 170 is positioned at the end of the machine, beneath the end of the cover 132, and extends through a slot in the bed 56. The roll 170 is rotatably disposed with respect to the shaft fixed to the bottom side of the transport bed 56. The roll 170 is driven as will be substantially described. A pressure roll 173 is disposed above roll 170.

The various movable parts of the machine are driven from an electric motor 174 which is fixed with respect to the frame portion 54. This drive of the movable machine parts is through the intermediary of the cam mechanism 114 which is fixed on the output shaft 176 of the motor 174. The cam mechanism 114 includes four cams 178, 180, 182 and 184 and an externally toothed drum portion 186. The cam 178 is formed with a high level lobe 178a; the cam 180 is formed with a lobe portion 180a; the cam 182 is formed with a peripheral depression 182a, and the cam 184 simply constitutes a raised circular rim portion on the outer end of the cam mechanism 114.

An internally toothed belt 188 extends around and is in engaging relation with respect to the drum portion 186 and also extends around idler pulleys 190 and 192 and an externally toothed pulley 194 that is fixed on the end of shaft 66 mounting the pick rolls 58, 60, 62 and 64. The idler rolls 190 and 192 are mounted at skew angles with respect to the center lines of shafts 176 and 66. The roll 192 is rotatably disposed on a shaft 196 fixed in any suitable manner to the frame portion 54, and the pulley 190 is rotatably disposed on a shaft 198 that is slideably disposed in a carrier 200 fixed with respect to the frame portion 54. A spring 202 is effective on the shaft 198, urging the pulley 190 outwardly for the purpose of maintaining the belt 188 taut.

An internally toothed belt 204 extends around the drum portion 186 and also around externally toothed driven pulleys 206, 208 and 210 and idler pulleys 212 and 214. The idler pulley 212 is rotatably mounted with respect to the frame portion 54, and the pulley 214 is rotatably mounted on the end of an arm 216 that is swingably mounted on the frame portion 54. A spring 218 is effective on the arm 216 for urging the pulley 214 to the right as seen in FIG. 3 for maintaining the belt 204 taut. The pulleys 206 and 208 are respectively rotatable with shafts 101 and 102. Pulley 210 is fixed on shaft 150 for thereby driving the rolls 146 and 148. An internally toothed belt 220 extends around the pulley 211, also fixed to shaft 150, and around a pulley 222 that is fixed on roll 170.

The came 180 is effective on the actuator for an electric switch 224 mounted on the frame portion 54 which may be used for controlling the machine. The lever 128 is provided with a downwardly depending arm portion 128a which bears on the cam 178 for thereby moving the finger 124 upwardly. The face cam 184 is effective on the lower part of the U-shaped portion 108a of the member 108 for moving the rolls 104 and 106 into pressure nipped relationship with respect to the rolls 40 and 42.

The cam 182 is effective on the end portion 78 of the hopper bed 32, and latch mechanism 226 is preferably provided for selectively holding the hopper bed 32 swung upwardly in a position for shielding the rolls 58, 60, 62 and 64 with respect to the bottom card of a deck of cards in the hopper 30 so as to prevent a feeding of the cards out of the hopper. The latching mechanism 226 comprises an electromagnet 228 carried by a bracket 230 which extends through and thus has a swinging connection with respect to the frame portion 54 and which also extends through an opening 232 in the portion 78 of the hopper bed 32. An armature 234 also extends through and has the same swinging movement with respect to the frame portion 54 as the bracket 230, and the armature 234 also extends through the opening 232 in the hopper bed 32. A flat spring 236 extends between the armature 234 and a portion of the electromagnet 228 for yieldably holding the armature 234 spaced from the core of the electromagnet 228. The armature 234 has a latching surface 238 adapted to engage the hopper bed 32 at an edge of the opening 232.

Figure 1:
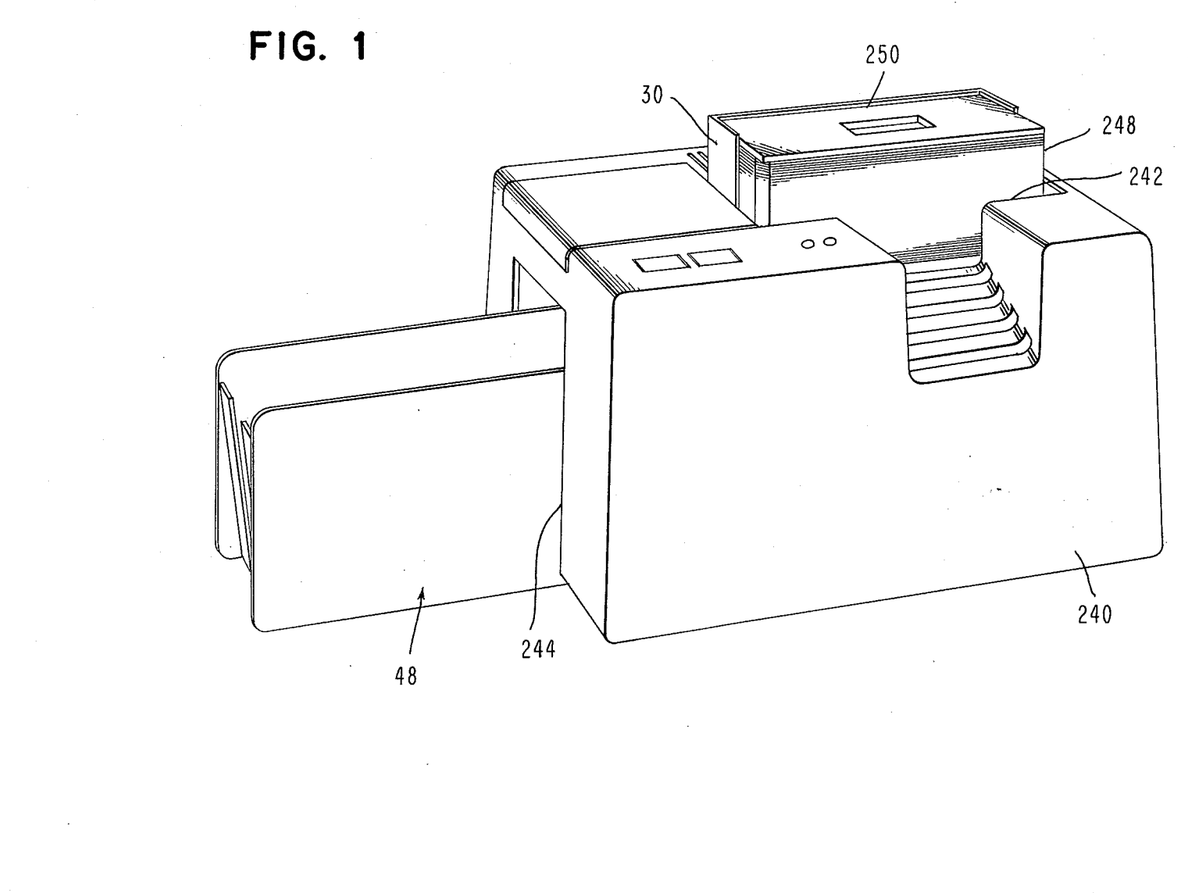
FIG. 1 is a perspective view of the machine of the invention with the cover of the machine in place.
Figure 2:
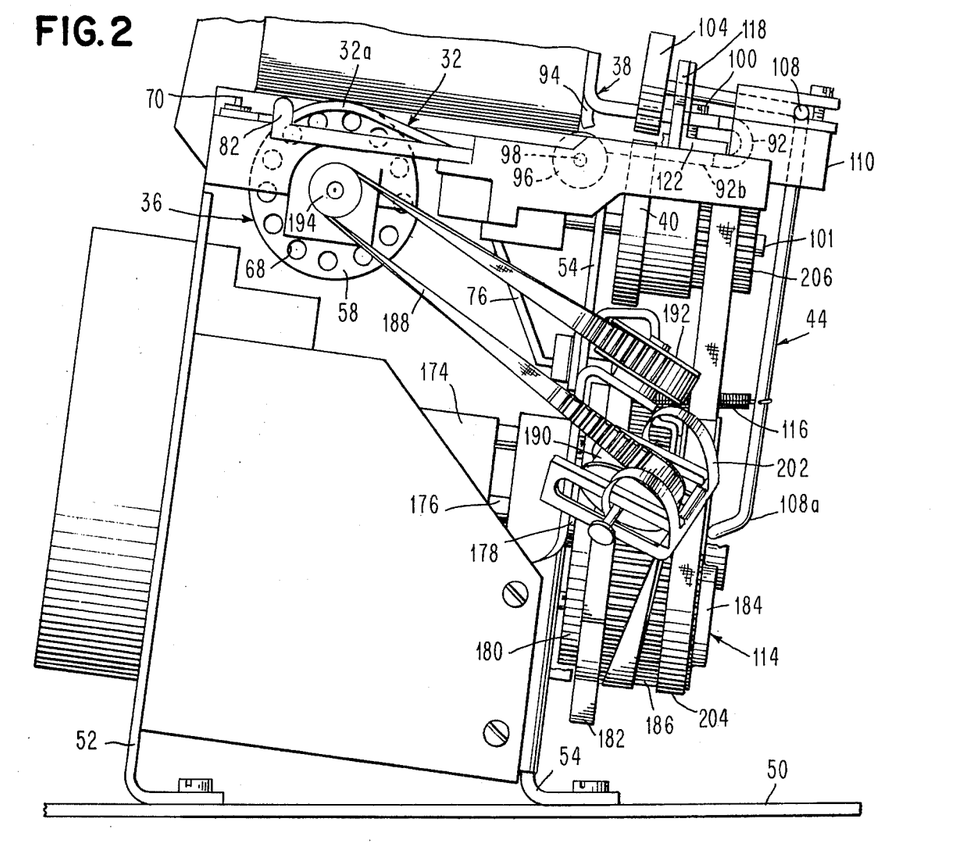
FIGS. 2, 3 and 4 are respectively end, rear and plan views of the machine with the cover removed.

The machine is preferably provided with a housing 240 (see FIG. 1). The hopper 30 protrudes through an opening 242 in the top panel of the housing 240, and the stacker 48 protrudes through an opening 244 in an end panel of the housing 240.

Figure 11:
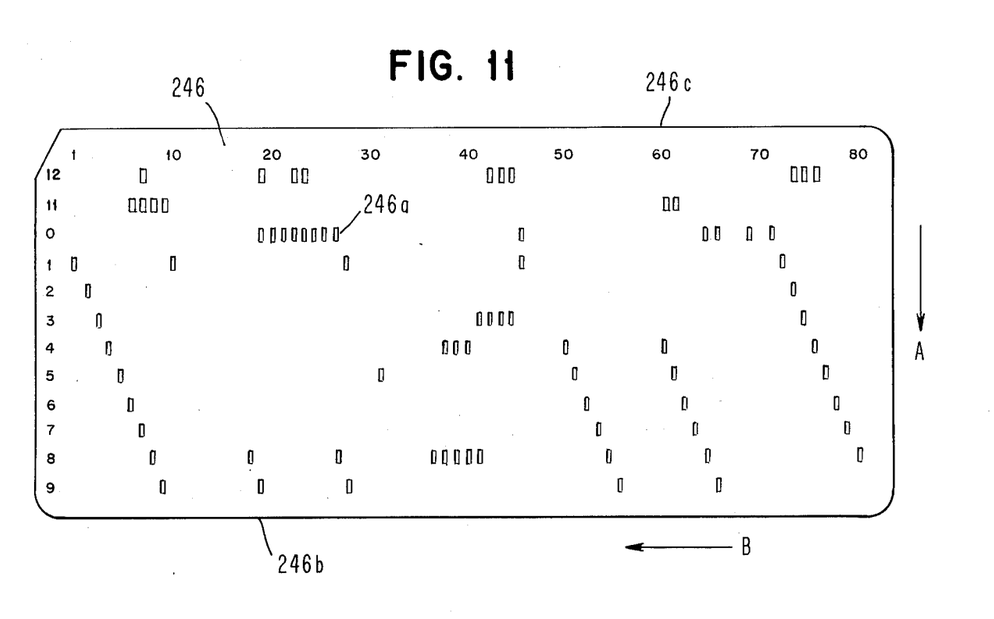
FIG. 11 is a face view of a document card used in the machine.

Although the machine may be designed for usage with document cards of many different sizes, it is considered particularly useful with the standard 80 column document card 246 shown in FIG. 11. This card is approximately 3¼ inches wide and 7⅜ inches long. The card has 80 columns extending transversely of the card and 12 rows extending longitudinally of the card. Punched data representative openings 246a may be provided at intersections of the rows and columns, and the machine of the invention reads these punched openings 246a as the card 246 moves through the machine. The document card 246 is punched in a standard manner. The punched openings 246a are rectangular and straight-sided, having lengths of ⅛ inch or 0.125 inch and widths of 0.055 inch. The long dimensions of the opening 246a extend transversely of the card. The rows (0, 1, 2, 3, 4, etc.) extending longitudinally of the card 246 are spaced ¼ inch on their centers, and the spacing between adjacent ends of openings 246a in adjacent rows and in the same column is thus one-eighth inch or 0.125 inch, the same as the lengths of the punched openings 246a.

In order to load the machine with the cards 246, they are placed in the hopper 30 in a deck 248 with a card weight 250 positioned on top of the deck. The cards 246 are placed in the hopper 30 with their face or printed side (shown in FIG. 11) down. It will be assumed that the motor 174 is in operation, and the motor drivingly rotates the came assembly 114 and the individual cams 178, 180, 182 and 184. The rolls 58, 60, 62 and 64 are rotatably driven by means of the belt 188 passing over the pulley 194 and the drum portion 186. The rolls 40, 42, 146 and 148 are driven by the belt 204 passing over the pulleys 206, 208 and 210, as well as over the drum portion 186. The roll 170 is driven by means of the belt 220 passing over the pulleys 211 and 222.

Figure 5A:
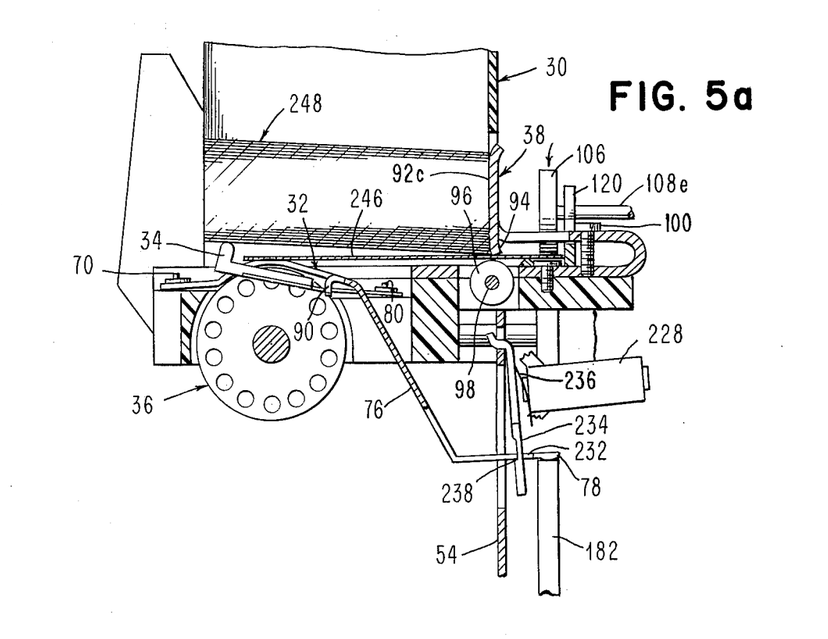
FIG. 5a is a view similar to FIG. 5 but with certain of the parts of the machine in changed positions.
Figure 6A:
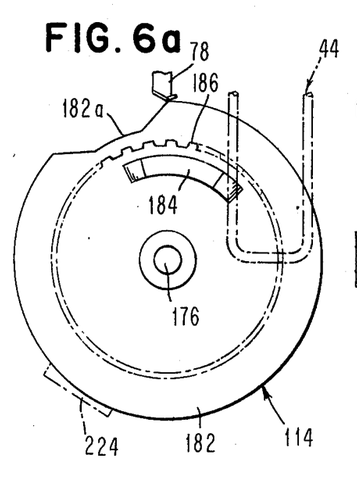
FIGS. 6a, 6b and 6c are respectively an end view of one end, a side view, and an end view of the other end of certain cam mechanism used in the machine.
Figures 6B, 6C:
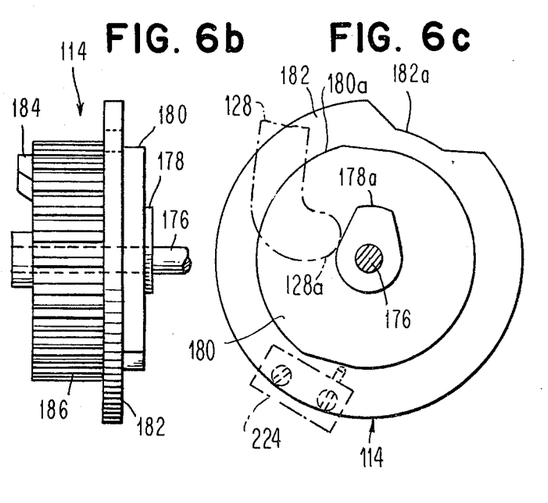

It will be assumed initially that the electromagnet 228 (see FIGS. 5 and 5a) is de-energized, so that the spring 236 is effective to hold the armature 234 against the side of the slot 232 in the hopper bed 32, with the latching surface 238 being beneath the edge of the slot 232. In this case, the latching surface 238 holds the hopper bed 32 at the upper limit of its swinging movement about the pins 70, and the curved portions 32a of the hopper bed 32 under these conditions are at a greater radius from the center of the shaft 66 than are the outer peripheral surfaces of the rolls 58, 60, 62 and 64. Thus, the outer peripheral surfaces of these rolls are shielded by the hopper bed 32 so that these rolls cannot be effective to act on the lowermost document card 246 in the hopper 30 and move the card.

In order to initiate the passage of a document card 246 through the machine, the electromagnet 228 is energized. The magnet armature 234 is thus swung against the action of the spring 235 toward the magnet 228, unlatching the hopper bed 32 from the latching surface 238 of the armature 234. The end portion 78 of the hopper bed 32 may then follow the cam 182; and, when the cam depression 182a reaches the end portion 78, the portion 78 enters the depression 182a. The hopper bed 32 then swings about the pins 70 so that the curved portions 32a of the hopper bed 33 move inwardly with respect to the outer peripheral surfaces of the rolls 58, 60, 62 and 64, baring the peripheral surfaces of these rolls with respect to the bottom card 246 in the hopper 30. The rolls 58, 60, 62 and 64 are effective to drive the lowermost card 246 in the direction A (see FIG. 11) transversely of the card 246 away from the hopper posts 30a and 30b defining the back of the hopper 30 and up the inclined forward surface of the raised bed portion 56a (see FIGS. 7 and 7a), onto the surfaces 56b, 56c and 56d and against the rails 118 and 120 which restrict the card from further movement in this direction. As the rolls 58, 60, 62 and 64 are shown in FIG. 4 in connection with the lowermost card 246, it is apparent that the rolls 58 and 60 are closer to the left end than to the right end of this card 246 and that the rolls 62 and 64 are closer to the right end than to the left end of this card 246 as this card 246 is shown in FIG. 4; and these rolls 58, 60, 62 and 64 are thus effective on the corresponding left and right portions of this card 246 as this card is shown in FIG. 4 in moving this card 246 against the rails 118 and 120.

At the limit of the movement of the card 246 in the direction A, its longitudinal edge 246b is in contact with the rails 118 and 120; and its other longitudinal edge 246c is just shy of the fingers 82, 84, 86 and 88. The card 246 is shown in this position by means of dot and dash lines in FIG. 4. Thus, when the fingers 82, 84, 86 and 88 are raised as will be described later, they contact the bottom of the card deck 248 exclusive of the bottom card which is in contact with the rails 118 and 120. The printed face of card 246 shown in FIG. 11 is down at this time.

The throat knife 38 has a gap between the knife portion 94 and the roll 96 of only slightly greater width than the thickness of a card 246, and the throat knife 38 thus assures that only the lowermost one of the cards 246 in the deck 248 may pass to a position against the rails 118 and 120 as just described.

On continued rotation of the motor driven shaft 176 and the cam mechanism 114, the hopper bed end portion 78 rides out of the inner dwell portion 182a of tge cam 182 and onto the high peripheral portion of the cam 182. It will be assumed that the electromagnet 228 has again been de-energized, and the armature 234 then again latches under the hopper bed portion 78 and holds the hopper bed 32 in its raised position in which the hopper bed 32 shields the lowermost card 246 in the deck 248 against the action of the pick rolls 58, 60, 62 and 64. Until the hopper bed 32 is thus lifted from these pick rolls, these rolls continue to force the bottom card 246 against the rails 118 and 120.

As the hopper bed 32 swings upwardly about its pivot pins 70 with the hopper bed end portion 78 moving out of the inner cam dwell 182a, the hopper bed 32 causes a corresponding upward swinging movement of the deck lifter 34 about its pivot pins 80. The deck lifter fingers 82, 84, 86 and 88 are thus swing upwardly; and they lift the card deck 248 off of the curved hopper bed portions 32a and off of the bottom card 246 in the vicinity of the rolls 58, 60, 62 and 64. This action is attained particularly in view of the fact that the fingers 82, 84, 86 and 88 move upwardly a greater distance than do the portions 32a of the hopper bed 32, as the end portion 78 of the hopper bed 32 moves onto the high peripheral portion of the cam 182 and out of the inner dwell 182a. This is due to the fact that the distance from the pins 80 to the fingers 82, 84, 86 and 88 is less than the distance from the pins 70 to the end portion 78 of the hopper bed 32 and due to the fact that the tang 90 connecting the parts 32 and 34 is effective approximately midway between the pins 80 and the fingers 82, 84, 86 and 88. The fingers 82, 84, 86 and 88 in their upward movement are thuse effective on the second lowermost card in the deck 248 and hold the deck 248 off of the bottom card 246 in contact with the rails 118 and 120, the bottom card 246 at this time having its longitudinal edge 246c in the position as shown in FIG. 4, just shy of the fingers 82, 84, 86 and 88. The card deck 248 in the hopper 30 thus has its one side adjacent the rolls 58, 60, 62 and 64 supported by the fingers 82, 84, 86 and 88, and the other side of the deck rests on the rollers 96 at this time. Thus, after the upward movements of the parts 32 and 34, the bottom card 246 in contact with the rails 118 and 120 is materially relieved of the weight of the deck 248 on it except over rolls 96 and is out of contact at this time with the pick rolls 58, 60, 62 and 64, so that the bottom card is substantially unimpeded in its further movement.

The dimensions of the parts of the machine, and particularly the location of the rails 118 and 120 with respect to the back 30a of the hopper 30 is preferably such that the bottom card 246 is moved transversely of the card in the direction A substantially ⅝ or 0.625 inch. This preliminary feeding in the direction A, transversely of the card 246, is done to overcome an interlocking and tearing problem of the webs between the holes 246a in the longitudinal rows of holes associated with feeding cards from the bottom of a deck serially (lengthwise of the cards). When a bottom card 246 in the deck 248 is displaced in the direction A with respect to the card just above it in the deck 248, an odd multiple of 0.125 inch (the rows 0, 1, 2, 3 and 4 in the card 246 are spaced twice this amount); the holes 246a in the bottom card 246 are in alignment with the imperforate spaces between the rows of holes 246a in the other card. Under these conditions, no interlocking or tearing of webs between holes 246 in the adjacent cards can take place, when one card is then moved serially in its longitudinal direction relative to the other. The machine does move the bottom card 246 which is in contact with the rails 118 and 120 serially (in the direction B) after the card has thus been previously moved transversely (in the direction A); and this will presently be described.

The bottom card 246 in the deck 248 in being moved into contact with the rails 118 and 120 enters the card sensor 122, blocking the transmission of light between the light source and the phototransistor of the sensor 122, signalling to associated circuitry that the card is in position for subsequent feeding. The sensor 122, as will be described, also senses when serial feeding of the card along the rails 118 and 120 is such that the trailing edge of the card passes out of the sensor, from between the light source and the phototransistor thereof.

With the bottom card 246 of the deck 248 being registered against the rails 118 and 120, the cam 184 is effective to pivot the assembly 44 about the journals 110 and 112 so as to move the pressure rolls 104 and 106 downwardly to have pressure nips with the rolls 40 and 42, with the bottom card 246 lying between the pressure rolls and the rolls 40 and 42. The rolls 40 and 42 are in continuous rotation, and the bottom card 246 lying against the rails 118 and 120 is thus driven serially or longitudinally (in direction B) toward the read station 46.

Most of the bottom document card 246 lying against the rails 118 and 120 and being moved serially still lies beneath the deck 248, with the second lowermost card in the deck 248 being partially in contact with the bottom card being moved serially. Since the rails 118 and 120 are so positioned that the bottom card 246 is preliminarily moved transversely (in direction A) for three and one-half rows (0.625 inch), the openings 246a in the bottom card 246 being fed serially are in alignment with solid, unpunched portions of the second card in the deck 248 between the longitudinal rows (0, 1, 2, 3, 4, 5, etc.) in the second card. Therefore, there can be no interlocking and tearing of the webs between adjacent holes 246a in any of the longitudinal rows in either the first or second cards as the bottom card in contact with the rails 118 and 120 is being fed serially by the rolls 40 and 42.

The drive rolls 40 and 42 and the pressure rolls 104 and 106 move the card 246 in contact with the rails 118 and 120 longitudinally (in the direction B) until the forward edge of the card enters the nips between the rolls 136 and 138 and the rolls 146 and 148. The rolls 146 and 148 are continuously driven, and the card is propelled through the read station 46 by the rolls 146 and 148. The assembly 44 pivots at this time to raise the pressure rolls 104 and 106 away from the drive rolls 40 and 42.

Figure 9:
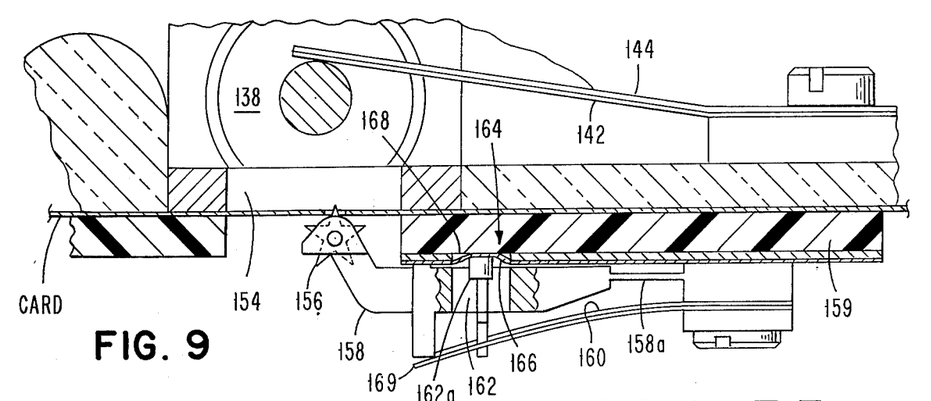
FIG. 9 is a view similar to FIG. 8 showing the parts of the starwheel-switch mechanism in changed positions.

The starwheels 156 on the ends of the levers 158 enter the punched opeings 246a in the bottom card 246 as the card passes through the read station 46. The corresponding levers 158 move upwardly as seen in FIG. 9 causing the corresponding plunger 162a to move upon tge corresponding switch 164 and complete an electrical circuit through the switch, indicating the presence of punched holes 246a at the particular locations. At the time column 1 of the card 246 passes into alignment with the starwheels 156, the trailing edge of the card 246 passes out of the sensor 122, again allowing the phototransistor of the sensor 122 to have light from the source of the sensor 122 applied thereto. The sensor 122 thus supplies an electric signal to the connected control system (not shown) indicating that a reading of the holes 246a in column 1 of the card 246 shall take place.

The lever 128 is swung counterclockwise as seen in FIG. 3 by the cam 178 immediately after the pressure rolls 104 and 106 move downwardly to feed the card 246 in contact with the rail 118 and 120, and the finger 124 is raised as the card is fed serially toward the read station 46. The lever 128 remains in its counterclockwise position, with the finger 124 raised, during the time the card moves serially from its initial position in contact with the rails 118 and 120 into the nips between the rolls 136 and 138 and the rolls 146 and 148. The finger 124 thus straightens the card 246 being thus fed serially, if the card has any warpage in it, and assures that the card shall be straight as it makes this movement. In particular, the finger 124 is effective to lift not only the front portion of the card 246 being fed along the rails 118 and 120 to the read station 46 but, being located beneath the front corner of the hopper deck 248 nearest the read station, also lifts this corner of the deck 248 upwardly slightly. When feeding card 246 of a particular warp, this in effect straightens the warp of the card being fed thus spanning the distance between the starwheels 156 and the trailing edge sensor 122 with a relatively flat card 246. Thus, the trailing edge of the card 246 as it passes out of the sensor 122 accurately indicates the position of column 1 of the card 246 which is the first column being read by the read station 46. A droop in the card, as is obvious, as the card is being moved serially toward the read station 46, would cause the sensor 122 to provide an electric signal at a time when column 1 is not actually in alignment with starwheels 156 so that reading under contol of the electrical signal from the sensor 122 would be done actually at the wrong times, resulting in inaccurate outputs from the switches 164.

Figures 7, 7A, 8:
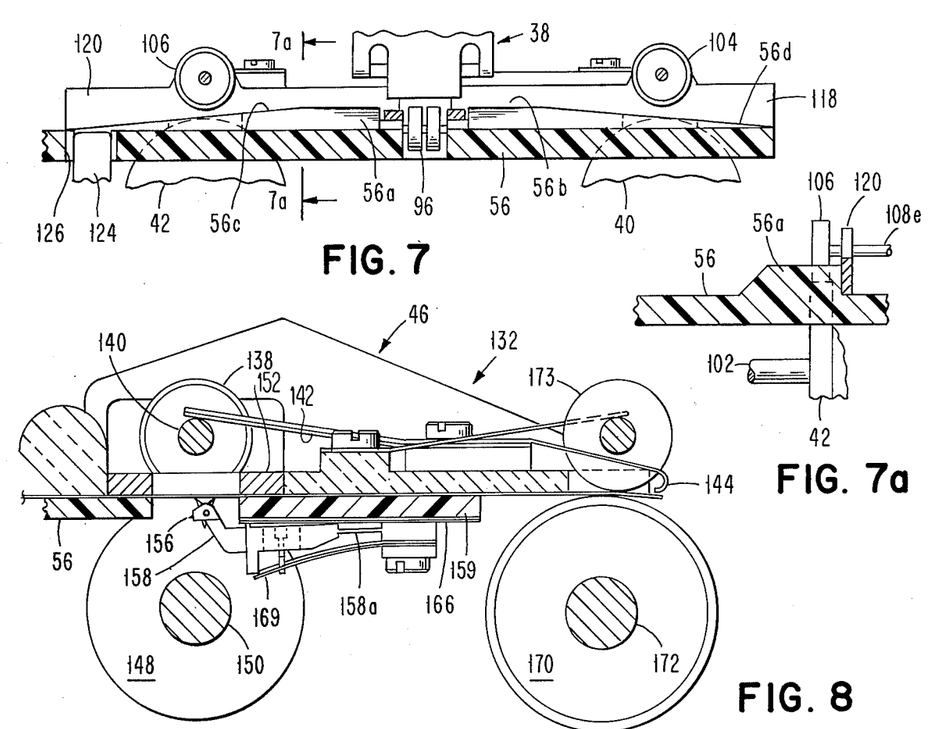
FIG. 7 is a sectional view taken on line 7—7 of FIG. 4 and showing certain raised document card guiding bed surfaces of the machine.
FIG. 7a is a sectional view taken on line 7a—7a of FIG. 7.
FIG. 8 is a sectional view taken on line 8—8 of FIG. 4 and showing certain starwheel-switch mechanism in the machine.

As the card 246 passes through the red station, the 80 columns of the card 246 successively come into alignment with the starwheels 156; and the switches 164 successively indicate the presence or absence of openings 246a in the successive columns. Each switch 164 opens between holes 246a being read as is shown in FIG. 7a, except between holes in adjacent columns. The signal from the sensor 122 in locating column 1 with respect to the starwheels 156 also is used by the control system so that the emitter 151 provides electrical pulses that establish the subsequent columns 2 to 80 of the card 246 passing through the read station whereby the output signals from the switches 164 are sampled at the proper times for reading the holes 246a in the subsequent columns. Eventually, the card 246 passes out of the read station and into contact with the constantly driven roll 170, and the roll 170 in combination with pressure roll 173 moves the card into the stacker 48. The diameter and speed of the roll 170 are such that the roll 170 skids slightly on the card 246 passing through the read station 46 until the card passes from the grip of the feed rolls 146 and 148, at which time the card is accelerated by the roll 170 and is deposited into the stacker 48. The uppermost edge of the stacker is located at a lower level than the uppermost part of the roll 170. Therefore, the stacker 48 cannot overfill; and, if the machine should be allowed by mistake to continue running after the stacker is full, the cards will simply run out on the floor. No stacker full switch is needed with this construction.

A card 246 in the deck 248 is fed therefrom each time that the electromagnet 228 is energized to allow the hopper bed 32 to drop, exposing the pick rolls 58, 60, 62 and 64. The path of movement of each of the successive cards and the reading action of the holes 246a in each of the successive cards is the same as has just been described for the first bottommost card of the deck 248.

In lieu of energizing the electromagnet 228 for feeding individual cards out of the hopper 30 and through the machine, the electromagnet 228 may be kept energized for feeding cards 246 successively, one card being fed for each 360° of rotation of the cam mechanism 114. In this case, the end portion 78 of the hopper bed 32 will entr the inner cam dwell 182a for each revolution of the cam 182, feeding a card 246 each time.

Figure 12:
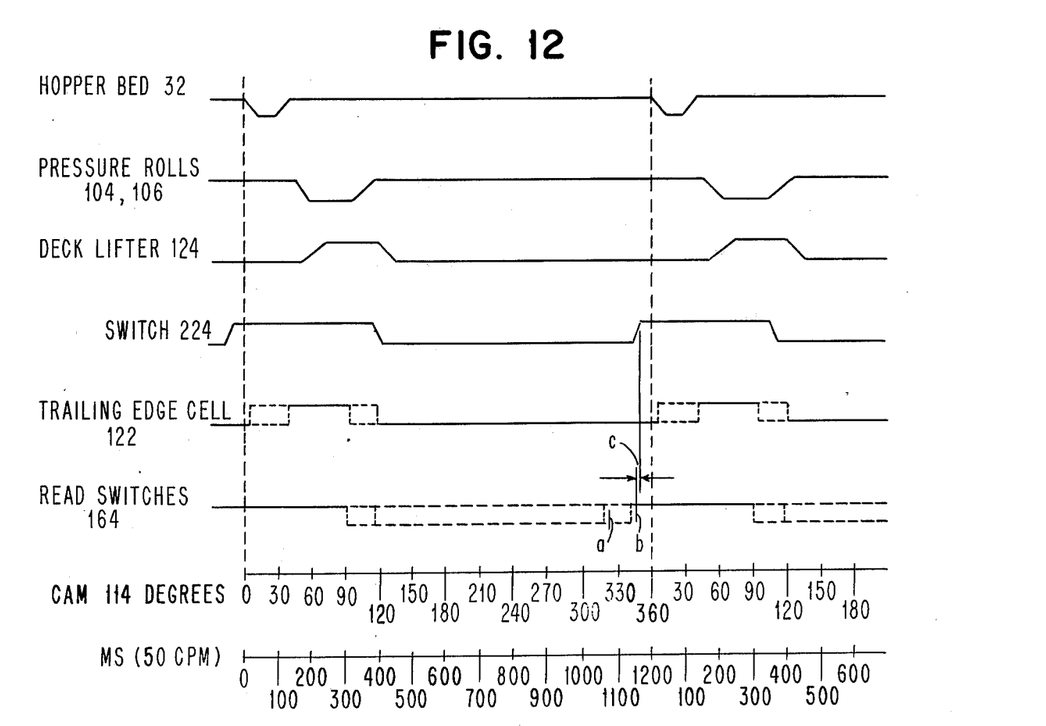
FIG. 12 is a timing diagram showing the relative times of movement of various parts of the machine.

FIG. 12 may be referred to for an understanding of the relative times of movement of the various movable parts of the machine. As will be observed from FIG. 12, the hopper bed 32 rises at about the same time as the pressure rolls 104 and 106 drop; and the deck lifter 34 rises at about the same time as the pressure rolls 104 and 106 drop. The switch 224 is in changed condition between about 350° and 120° rotation of the cam assembly 114. The switch 224 may be used for its changed condition between 350° and 120° of the cam assembly to inhibit a change in state of the feed magnet 228 and may be caused to make a check of the sensor 122 at the time it again changes state at 120° of the cam assembly 114. The trailing edge cell 122 changes in state as shown in FIG. 12, and depending on slippage of the pick rolls 58, 60, 62 and 64 and depending on the slippage of the pressure rolls 104 and 106 may change in state between the dotted line portions of the curve showing the state of the trailing edge cell 122 in FIG. 12. The read switches 164 are effective for a reading between 90° and 315° approximately of the cam assembly 114, and the reading of column 1 may take place between approximately 90° and 115° of the cam assembly 114 as indicated by the dotted portions of the curve 164 in FIG. 12. The reading of the document holes 264a is complete between the times a and b respectively at approximately 320° and 345° of the cam assembly 114 at which times a column 85 (if it existed) of the card 246 would pass across the starwheels 156. The amount of slippage of the pressure rolls 104 and 106 will determine the exact time at which the postulated column 85 would pass across the starwheels. The attached control system for the reader is assumed to require 10 milliseconds compute time before another card 246 is to be fed, and this is the time between the points b and c in FIG. 12 (equivalent to the time required for the cam assembly 114 to rotate about 5°).

The document card reading machine of the invention advantageously is one of the serial type, that is, one by means of which punched document cards move longitudinally through a read station. The document cards have many more transverse columns than longitudinal rows of punched opening; and, therefore, it is only necessary to have as many reading means (starwheels 156) as there are longitudinal rows. The document cards are of a standard type having transversely extending rectangular punched holes through them for containing encoded information; and, if such cards are fed serially from the bottom of a deck of such cards, interlocking and tearing of the webs between adjacent holes in the longitudinal rows can be expected due to the shape and size of the holes. Therefore, the maching of the invention first feeds the document cards 246 transversely from the bottom of a deck under which conditions there can be no web interlocking or tearing (because the punched card openings are narrow and extend transversely of the card). The cards 246 are so fed transversely for a distance less than the card width and for an odd multiple of ⅛ inch so that the rows of the card that is fed exactly register with the spaces between the rows of holes of the document card immediately above in the deck. This results from the fact that the length of the punched holes 246a is ⅛ inch and the distance between the punched holes of consecutive longitudinal rows is also ⅛ inch. Since the punched openings 246a in the card 246 that is fed exactly correspond with the spaces between the longitudinal rows of the card 246 immediately thereabove, there can be no web interlocking and tearing on subsequent longitudinal feeding of the first card out from under the card deck.

The transverse feeding of document cards 246 from the bottom of the deck 248 is advantageously obtained by raising and lowering the hopper bed 32 so that the pick rolls 58, 60, 62 and 64 are intermittently exposed and shielded with respect to lowermost cards in the deck 248. The hopper deck lifter 34 is actuated by the hopper bed 32 as the bed 32 raises, and the fingers 82, 84, 86 and 88 raise in contact with the deck 248 in the area of it which has been exposed by the moving of the bottom card 246 to the aligning rails 118 and 120. The hopper deck lifter 34 thus is advantageously effective to take most of the weight of the deck 248 off of the bottom card which has been fed to the aligning rails 118 and 120 and which now must be fed serially along the rails 118 and 120 to the read station 46. The deck 248 is thus held raised from the portion of the bottom card 246 adjacent the longitudinal edge 246c, and the deck 248 only rests with its portion adjacent its edge 248a on the bottom card. Thus, the weight of the deck 248, insofar as the bottom card 246 is concerned, has been halved. One half of the weight of the deck 248 is supported by the fingers 82, 84, 86 and 88; and the other half of the weight of the deck 248 rests on the bottom card adjacent the side 248a of the deck. It will be noted from FIG. 4 that the side edge 248a of the deck 248 is parallel with and is spaced only a slight distance from the edge 246b of the bottom card along which the rolls 40 and 42 are effective to provide a driving force for moving the card longitudinally into the read station 46. Whatever weight of the deck 248 is effective on the bottom card 246 is thus applied close to the card edge 246b on which propelling force is applied, and there thus is little tendency for the card to be skewed out of proper feeding position away from the rails 118 and 120 as it is moved by the rolls 40 and 42 longitudinally. Also, since one-half of the weight of the deck 248 is supported in this manner by the fingers 82, 84, 86 and 88, it has been possible to reduce the forces between the pressure rolls 104 and 106 and the feed rolls 40 and 42 and between the pressure rolls 136 and 138 and the feed rolls 146 and 148 approximately half, since the force required to pull the bottom card 246 out from under the deck 248 has thus been approximately halved.

The batch document card reader as above disclosed constitutes a small, light weight, low cost machine. This is particularly true in view of the fact that the initial transverse movement of the document cards in the direction A is for only a relatively short distance. In the example given above, a card 246 is moved 0.625 inch, while the width of the card is 3.25 inches. The transverse movement is thus for less than 25 percent of the card width. The width of the machine accommodating this relatively short transverse card movement is considerably less, therefore, than would be the case if the cards 246 from the hopper 30 were moved initially for more than card width to a separate cornering station as in certain prior machines. The additional drive rolls generally used in connection with such prior machines also therefore are not necessary. The switches 164 constitute a relatively inexpensive mechanism for reading the document cards and in connection with the other parts of the machine help to make the machine relative small and low cost. This result is also attained in part due to the fact that only a single pair of drive rolls 146 and 148 is positioned adjacent the reading starwheels 156. The cards 246 are driven by a minimum number of drive rolls in the machine, and therefore a relatively low power, small electric motor 174 may be used in the machine, this also being a reason for the relatively small size of the machine.

The above description is considered adequate for a person skilled in the art to practice the invention; however, if additional detail is desired regarding the throat knife 38, this may be secured from the publication "IBM Technical Disclosure Bulletin," Volume 16, No. 7, December, 1973, page 2341 in the article entitled "Throat Knife and Ramp For Document Cards" by J. M. Rigotti. Likewise, if additional detail is desired regarding the latch assembly 228, this may be secured from the "IBM Technical Disclosure Bulletin," Volume 16, No. 9, February, 1974, page 3002 in an article entitled "No Adjustment Magnet Assembly" by J. M. Rigotti.

Although we have described our machine in connection with the read station 46, it will be apparent that a document card punch station or a document card print station could be substituted for the read station. It will also be apparent that any two or all three of these stations could be used in lieu of the read station that is specifically disclosed.

We claim:

1. In a machine for operating on document cards of the type having a plurality of longitudinally extending rows and transversely extending columns for rectangular data representative holes through the card each of which has its long dimension extending transversely of the card and with said rows being spaced apart so that there are substantial imperforate parts of the card between the holes of adjacent rows, the combination of:
   a hopper for a deck of the cards,
   pick roll means on the bottom of said hopper so positioned as to move in translation a bottom document card of the deck in a direction sidewardly out of said hopper and transversly of the bottom card,
   stop means positioned to make contact with said bottom card as so moved in translation and spaced such a distance from said hopper to limit the translating movement of said bottom card to a particular position in which the bottom card is only partially out from below the deck and in which its data representative holes are in registry with the imperforate parts between holes of adjacent rows of the second lowermost card in the deck, and
   means for moving said bottom card longitudinally of the card after it has been placed by said pick roll means in its said position in contact with said stop means.

2. In a machine as set forth in claim 1, said pick roll means including two spaced pick rolls on the bottom of said hopper, one of said pick rolls being located closer to a first one of the transversely extending ends of said bottom document card than to the opposite, second transversely extending end of said bottom document card and the other of said pick rolls being located closer to said second card end than to said first card end.

3. In a machine for operating on document cards of the type having a plurality of longitudinally extending rows and transversely extending columns for rectangular data representative holes through the card, said holes having lengths transversely of the card of about ⅛ inch and said rows being spaced about ¼ inch on their centers, the combination of
   a hopper for a deck of the cards,
   pick roll means on the bottom of said hopper so positioned as to move in translation a bottom document card of the deck in a direction sidewardly out of said hopper and transversely of the bottom card,
   stop means positioned to make contact with said bottom card as the bottom card is so moved in translation and spaced such a distance from said hopper to limit the translating movement of said bottom card to a particular position in which the bottom card is only partially out from below the deck and in which the bottom card has been moved a distance about equal to an odd multiple of ⅛ inch so that said data representative holes are in registry with imperforate parts between holes of adjacent rows of the second lowermost card in the deck, and
   means for moving said bottom card longitudinally of the card after it has been placed by said pick roll means in its said position in contact with said stop means.

4. In a method for removing cards one at a time from a deck of the cards, said cards being of the type having a plurality of longitudinally extending rows and transversely extending columns for rectangular data representative holes through the card which have their long dimensions extending transversely of the card and with said rows being spaced apart so that there are substantial imperforate parts of the card between the holes of adjacent rows, the steps of:
   moving in translation the bottom card of the deck of cards in a direction at right angles to the longitudinal center line of the card and for a certain distance less than the width of the card to place the card in a position partially withdrawn from the card deck in which the holes of the card being moved in register with imperforate parts between the holes of adjacent rows of the next lowermost card in the deck, and
   then moving said bottom card from beneath the deck in a direction parallel with the longitudinal center line of the card for completely separating the card from the deck.

5. In a method for operating on document cards stacked in a deck, said cards being of the type having a plurality of longitudinally extending rows and transversely extending columns for rectangular data representative holes through the card which have their long dimensions extending transversely of the card and with said rows being spaced apart for a distance substantially equal to the long dimensions of said holes so that there are substantial imperforate parts of the card between the holes of adjacent rows, the steps of:
   moving in translation the bottom card of the deck of cards in a direction at right angles to the longitudinal center line of the card for a distance which is equal to an odd multiple of the long dimensions of said holes and less than the width of the card to partially withdraw the bottom card from the deck and place it in a position in which the holes of the bottom card are in registry with the imperforate parts between adjacent rows of the next lowermost card in the deck whereby to prevent interlocking of webs between adjacent holes in longitudinally extending rows of the cards, and
   then moving the bottom card as so partially withdrawn from said deck of cards in a direction parallel with the longitudinal center line of the card.

6. In a method for operating on document cards stacked in a deck, said cards being of the type havng a plurality of longitudinally extending rows and transversely extending columns for rectangular data representative holes through the card, said holes being about ⅛ inch long in the transverse direction of the card and said rows being spaced about ¼ inch on their centers, the steps of:
   moving in translation the bottom card of the deck of cards in a direction at right angles to the longitudinal center line of the card for a distance which is equal to an odd multiple of ⅛ inch and less than the width of the card to partially withdraw the bottom card from the deck and place it in a position in which the holes of the bottom card are in registry with the imperforate parts between adjacent rows of the next lowermost card of the deck whereby to prevent interlocking of webs between adjacent holes in longitudinally extending rows of the card, and then moving the bottom card as so partially withdrawn from said deck of cards in a direction parallel with the longitudinal center line of the card.

7. In a machine for operating on document cards, the combination of:

a generally vertical hopper for a deck of the cards and having an aperture in a side thereof at the bottom of the hopper, a pick roll on the bottom of said hopper which when rotated propels the bottom card of the deck out through said aperture partially from beneath the remainder of the cards in the deck, pick roll shielding means positioned at the bottom of said hopper and at the side edges of said pick roll and moveable upwardly so as to shield the deck of cards with respect to said pick roll, second movable means at the bottom of the hopper and also moveable upwardly and positioned adjacent the side of said hopper which is remote from said aperture so as to lift the card from the bottom card of the deck which has been fed through said aperture, and means for moving said bottom card which has been fed through said aperture longitudinally of the bottom card after said deck has been so lifted from this card.

8. A machine as set forth in claim 7, said pick roll shielding means constituting a plate having an aperture through which the upper peripheral surface of said pick roll extends and said second moveable means including a plurality of moveable fingers positioned adjacent said side of said hopper remote from said aperture.

9. A machine as set forth in claim 7, said pick roll shielding means including a plate having an aperture through which said pick roll extends and pivotally mounted at one side of the pick roll adjacent said side of said hopper remote from said aperture, said second moveable means including a plurality of fingers on opposite sides of said pick roll which are pivotally mounted between said pick roll and the side of said hopper containing said aperture.

10. A machine as set forth in claim 9 and including mechanical interconnecting means between said plate and said fingers so that said fingers are raised as said plate is raised and said fingers are raised a greater distance than said plate.

11. Apparatus for feeding record cards having rows of punched holes from the bottom of a stack, said apparatus comprising:

a throat for receiving a first edge of the bottom record card of the stack;

first means for moving said bottom card in a direction perpendicular to said first edge so that said bottom card enters a predetermined distance into said throat, which predetermined distance is sufficient to offset the rows of punched holes of said bottom card from the rows of punched holes of the card next above said bottom card; and second means for moving said bottom card in a direction parallel to said first edge when said bottom card is entered said predetermined distance into said throat whereby the rows of punched holes in the bottom card slide in the spaces between the rows of punched holes in the card next above it as it is moved by said second means.

* * * * *